United States Patent
Kappe et al.

(10) Patent No.: US 7,067,071 B1
(45) Date of Patent: Jun. 27, 2006

(54) ZINC SULFIDE ELECTROLUMINOPHORES AND METHOD FOR PRODUCTION THEREOF

(75) Inventors: Frank Kappe, Rheda-Wiedenbrück (DE); Benedikt Ahlers, Berlin (DE); Arnim Franz-Burgholz, Berlin (DE); Hans-Jürgen Limburg, Tiefenort (DE); Detlef Starick, Bad Liebenstein (DE); Monika Voh, Breitungen (DE)

(73) Assignees: Bundesdruckeri GmbH, Berlin (DE); Leuchtstoffwerk Breitungen GmbH, Breitungen (DE)

( * ) Notice: Subject to any disclaimer, the term of this patent is extended or adjusted under 35 U.S.C. 154(b) by 0 days.

(21) Appl. No.: 09/869,956

(22) PCT Filed: Nov. 9, 2000

(86) PCT No.: PCT/EP00/11069

§ 371 (c)(1),
(2), (4) Date: Oct. 15, 2001

(87) PCT Pub. No.: WO01/34723

PCT Pub. Date: May 17, 2001

(51) Int. Cl.
C09K 11/56 (2006.01)
C09K 11/58 (2006.01)

(52) U.S. Cl. .................. 252/301.6 S; 428/404
(58) Field of Classification Search ......... 252/301.6 S, 252/30.6 S; 428/403–407
See application file for complete search history.

(56) References Cited

U.S. PATENT DOCUMENTS

| 2,980,627 | A | * | 4/1961 | Swindells ............. 252/301.6 S |
| 3,025,244 | A |  | 3/1962 | Aven |
| 3,607,772 | A | * | 9/1971 | Kozak ................. 252/301.6 S |
| 4,442,136 | A |  | 4/1984 | Johnson |
| 4,486,499 | A | * | 12/1984 | Morimoto .................. 428/336 |
| 4,508,760 | A | * | 4/1985 | Olson et al. ........... 427/213.34 |
| 4,859,361 | A |  | 8/1989 | Reilly et al. |
| 4,874,985 | A | * | 10/1989 | Hase et al. ................. 313/487 |
| 5,244,750 | A | * | 9/1993 | Reilly et al. ............... 428/690 |
| 5,269,966 | A |  | 12/1993 | Karam et al. |
| 5,273,774 | A |  | 12/1993 | Karam et al. |
| 5,635,111 | A |  | 6/1997 | Kawano et al. |
| 5,643,496 | A |  | 7/1997 | Brese et al. |
| 6,077,458 | A | * | 6/2000 | Shiiki et al. .......... 252/301.4 R |
| 6,143,202 | A | * | 11/2000 | Christensen et al. ........ 252/373 |
| 2002/0195588 | A1 | * | 12/2002 | Marking et al. ....... 252/301.6 S |

FOREIGN PATENT DOCUMENTS

| DE | 21160 | 4/1961 |
| DE | 1 155 873 | 10/1963 |
| DE | 28 04 155 | 8/1978 |
| DE | 36 21 209 | 1/1987 |
| DE | 37 12 004 | 11/1987 |
| DE | 197 38 843 | 3/1998 |

(Continued)

OTHER PUBLICATIONS

Zavyalova et al., "ZnS:Mn electroluminescent films prepared from chelate metal-organic compounds", *Displays*, 1997, p. 73-78, vol. 18.

(Continued)

*Primary Examiner*—C. Melissa Koslow
(74) *Attorney, Agent, or Firm*—Browdy and Neimark, PLLC.

(57) ABSTRACT

Zinc sulfide electroluminophores are prepared from solutions of zinc salts with hydrogen sulfide. The zinc sulfide compounds are mixed with activator and coactivator compounds to produce luminophores, and the mixtures are fired in the presence of fixing agents. These fired materials are then treated in an acid bath, washed, neutralized, and optionally filtered and dried.

3 Claims, 2 Drawing Sheets

FOREIGN PATENT DOCUMENTS

| | | |
|---|---|---|
| DE | 197 08 543 | 9/1998 |
| EP | 0 297 644 | 1/1989 |
| EP | 0 298 745 | 1/1989 |
| GB | 853654 | 11/1960 |
| GB | 1088318 | 10/1967 |
| WO | WO 91/16722 | 10/1991 |

OTHER PUBLICATIONS

D. Denzler et al., "Luminescent studies of localized gap states in colloidal ZnS nanocrystals", *Journal of Applied Physics*, 1998, p. 2841-2845, vol. 84, No. 5.

Abstract of JP 56082875, Jul. 6, 1981.

\* cited by examiner

ZINC SULFIDE ELECTROLUMINOPHORES AND METHOD FOR PRODUCTION THEREOF

REFERENCE TO RELATED APPLICATIONS

The present application is the national stage under 35 U.S.C. §371 of international application PCT/EP00/11069, filed Nov. 9, 2000 which designated the United States, and which application was not published in the English language.

The present invention relates to zinc sulfide (ZnS) based fine-grain electroluminescent phosphors and methods for their production.

Phosphors of this type are generally doped with copper (Cu), however, optionally also with copper and/or gold (Au), as well as with copper and manganese (Mn) and they furthermore contain one or more coactivators, for which purpose halide anions (Cl, Br, I) or certain tervalent cations (e.g., Al, Ga, In) are usually inserted into the ZnS lattice.

In dependence upon their specific chemical composition, the zinc sulfide electroluminophores emit in the blue, green or yellow-orange range of the visible spectrum. In technical applications they are used to manufacture electroluminescent lamps that are used either for the background lighting of LCD displays (clocks, pocket calculators, mobile telephones, instrument lighting, etc.) or as luminous and marking elements, e.g., in airplanes and motor vehicles, in the interior and on the facades of buildings, as well as in advertising fixtures, etc.

It is known that zinc sulfide electroluminophores, as compared to technical luminescent substances for the LTV, X-ray and cathode ray excitation, have a comparatively short life. The half-life (which is the time in which the brightness of the EL phosphors decreases to half its original value) of unencapsulated electroluminophores is only a few hundred hours. It is widely believed that their service life is significantly influenced, among other factors, by the grain size of the electroluminophores. This is one of the reasons why commercially available ZnS EL phosphors typically have average grain sizes in the range of 20 to 40 μm.

However, the extent to which pigments of such a large size can be made into high-quality layers is limited. In the commonly used screen printing techniques, for example, they require the use of comparatively large screens, resulting in dry layer thicknesses of up to 40 μm. These often display a visibly uneven EL emission due to the unavoidable inhomogeneities of such layers.

Another shortcoming of the resulting thick electroluminescent arrangements that is attributable to the large grain size of commercially available EL pigments lies in the fact that relatively high supply voltages are required to attain the desired levels of brightness. These can result in high stresses on the incorporated binding agents and thus in a reduction in the service life of the EL arrangements.

Moreover, with the use of the coarse EL pigments according to the prior art, it is possible that individual particularly large luminophore particles can protrude from the layer despite the adjusted layer thickness of up to 40 μm. In these cases the voltage stability and/or electric strength of the EL films is reduced, resulting in an additional reduction in their service life.

A significant reduction in the average grain size of the EL phosphors and simultaneous preservation or improvement of the brightness and durability values is therefore highly desirable for many technical applications that are based on the use of screen printing processes.

If, as recently proposed in DE 19 708 543, EL pigments are even to be processed into fine graphic structures, such as security elements in the field of value product printing by means of intaglio or offset printing processes, the availability of fine-grain EL phosphors must be considered an essential prerequisite for the technical feasibility of such an application. Experience has shown that it is necessary in this case to use average pigment grain sizes of 2 to 6 gm to be able to meet the technical requirements of these printing processes.

Methods for producing efficient EL phosphors have been known for a long time. The pertinent prior art is described, for example, in U.S. Pat. No. 4,859,361 and in WO 91/16722. According to those patent documents, the following steps are required to produce Cu doped or Cu and Mn doped ZnS electroluminophores that are coded with the usual coactivators:

Step 1: Preparation of a mixture of ZnS, the desired quantity of an EL activator (e.g., $CuSO_4$) and a coactivating, halide-containing fluxing agent (usually $BaCl_2$, $MgCl_2$, NaCl).

Step 2: Firing of this mixture at temperatures between 1000 and 1300° C.

Step 3: Cooling of the fired material to room temperature and rinsing with water.

Step 4: Mechanical working of the material by milling.

Step 5: Renewed firing of the thusly treated material in the temperature range between 600 and 900° C., optionally after previous renewed addition of $ZnSO_4$ and $CuSO_4$.

Step 6: Cooling to room temperature and optional quenching with $H_2O$ after a certain cooling time.

Step 7: Optional washing with $H_2O$ and/or mineral acids to remove soluble components and with KCN solution to remove excess $Cu_2S$.

Particular importance is attached by the invention to the $4^{th}$ preparation step. The mechanical working of the material that was first fired at 1000 to 1300° C. is intended to transform a portion of the hexagonal ZnS electroluminophore formed under these conditions into the cubical crystal form. It is alleged that a transformation of this type effects an improvement of the brightness of the EL phosphors and particularly increases their life. When the described process and comparable process variations are used, zinc sulfide electroluminophores with average grain sizes between 20 and 40 μm are obtained and individual particles may still significantly exceed this range of grain sizes. This can be attributed mostly to the high firing temperatures, as well as to the use of fluxing agents with a strongly mineralizing effect. Electroluminophores of this grain size class have the above-described shortcomings.

In patent document U.S. Pat. No. 5,643,496, the process is modified to the extent that zinc sulfide electroluminophores can be obtained that have a grain size smaller than 23 μm, preferably 21 μm, and which, by adjusting the temperature of the first firing process to between 1100 and 1190° C., preferably to 1160° C., allegedly reach the level of 25 μm large ZnS electroluminescent materials regarding their attainable levels of brightness and half lives.

Such a minor reduction in the average grain size of the electroluminophores hardly results in any noticeable improvements even for the use in screen printing processes. The principal shortcomings of EL phosphor particles of this coarseness largely still exist.

Average EL pigment grain sizes in the range of 10 μm can allegedly be attained with a process according to U.S. Pat. No. 5,635,111; however, the solution described in that patent document has significant technical shortcomings. These lie in the fact that, on one hand, the firing is performed in a complicated vacuum apparatus in the presence of extremely aggressive and toxic gases (halogen halides, $H_2S$), which involves the associated risks if the apparatus should fail. On the other hand, the very time consuming and expensive process hardly appears suitable for producing larger quantities of EL luminophores under technical conditions. The present invention is therefore based on the object of creating a novel, cost-effective method for producing fine-grain zinc sulfide electroluminophores that can be made into efficient and long-lived electroluminescent layers of a high quality with various printing techniques.

SUMMARY OF THE INVENTION

In accordance with the present invention this object is met with the technical teaching, of claim 1. The inventive process is characterized accordingly by the following preparation steps and measures:

Step 1: Preparation of special, fine-grain zinc sulfides and use of these materials as a starting product for the synthesis of the inventive fine-grain zinc sulfide electroluminophores.

The preparation of zinc sulfide starting materials of this type takes place by precipitation of ZnS from the solutions of zinc salts, such as e.g., $ZnSO_3$, $Zn(NO_3)_2$ and $ZnCl_3$, preferably from zinc sulfate solutions, with the aid of induced $H_2S$ gas or resulting from the addition of $H_2S$-generating compounds at temperatures of 20 to 80° C. and a pH between 0.5 and 3.0. The zinc ion concentration of the given zinc salt solutions is adjusted to values of 0.25 moles/l to 2.0 moles/l.

This precipitation reaction produces as a result fine-grain zinc sulfides with very narrow grain-size distributions and the desired average grain size can be controlled by guiding the process parameters, such as, e.g., the zinc ion concentration, the speed with which the $H_2S$ is passed in, the stirring speed, the temperature, and the pH.

The average grain sizes of the zinc sulfides prepared according to this invention and used as the starting material for the synthesis of the inventive electroluminophores are typically 2 to 20 μm, preferably 2 to 5 μm or 5 to 15 μm.

A further advantage lies in the fact that, in addition to the grain sizes, the surface properties of the ZnS precipitation products can also be controlled via the specific selected precipitation conditions. This results in compact ZnS crystallites with a very low tendency to form agglomerates. These special morphological characteristics of the ZnS starting materials prepared according to this invention advantageously affect the grain structure and the performance of the resulting inventive electroluminophores.

A further advantage lies in the fact that, in addition to the grain sizes, the surface properties of the ZnS precipitation products can also be controlled via the specific selected precipitation conditions. This results in compact ZnS crystallites with a very low tendency to form agglomerates. These special morphological characteristics of the ZnS starting materials prepared according to this invention advantageously affect the grain structure and the performance of the resulting inventive electroluminophores.

Step 2: Mixing of the fine-grain ZnS starting materials produced according to this invention with the activator-coactivator compounds required for the luminophore formation.

The copper and/or gold compounds, or copper and/or gold and manganese compounds (e.g. $CuSO_4$, $HAuCl_4$, $0.4H_2O$, $MnSO_4$) which are used as activator materials, Au tetrachlorolaurate as well as aluminum compounds (e.g. $Al(NO_3)_3$) that may be required for the coactivation may already be added during the precipitation of the ZnS or also to the washed ZnS suspension after completion of the precipitation. This permits a homogeneous distribution of the activators and coactivators in the preparation mixture that is advantageous for the process of the luminophore formation, and also a close contact between the activator, coactivator and ZnS particles.

However, it is also possible to dry mix the activator and coactivator compounds and the zinc sulfide prepared according to this invention. In this case a preferred process variant consists of first homogenizing the activator and coactivator compounds with a portion of the dried ZnS and then blending this mixture with the remaining amount of ZnS that is required to ensure the desired luminophore composition.

To this mixture the fluxing agents, which are described in more detail below, are then added as well:

Step 3: A one to ten-hour firing of the mixture at temperatures below 1000° C., preferably in the temperature range between 800 and 1000° C. in air or in an inert nitrogen atmosphere or in an atmosphere consisting of a mixture of nitrogen and 1 to 10% hydrogen in the presence of fluxing agents with an only slightly mineralizing action selected from the compound classes of the fluorides, bromides and iodides.

After completion of the firing process, the fired product is then cooled to room temperature, subsequently washed with deionized water and then optionally filtered and dried.

In this manner it is effectively ensured that the average grain size and grain size distribution of the zinc sulfide electroluminophores after completion of the firing process and processing of the fired product essentially conform to the ZnS starting material prepared according to this invention and used for the luminophore synthesis. The inventive fine-grain ZnS electroluminophores that are obtained with this process step have typical medium grain sizes between 2 and 20 μm, preferably between 2 and 5 μm or 5 and 15 μm.

It is important compared to the prior art that the described firing process is performed at temperatures below 1000° C. and that the presence, especially of chloride-containing or strongly mineralizing fluxing agents is completely abstained from. While it is true that the use of fluoride and/or bromide and/or iodide-containing fluxing agents does enhance the reconstruction of the ZnS lattice and the targeted inclusion of the activators required for the formation of the luminophores, their operating mechanisms are such that the grain growth can effectively be limited in the described temperature range.

The fluxing agents that are used according to this invention can, at the same time, function as a source for the insertion of the coactivators. For this purpose they optionally receive certain tervalent cationic components (e.g. $Al^{3+}$ $Bi^{3+}$ in addition to the above halide anions and other cationic components.

A further advantage of the inventive process compared to the prior art ties in the fact that the synthesized electroluminophores remain completely in their cubic crystal modification because of the firing temperature being limited to a maximum of 1000° C. As will be described later, this fact results in advantages regarding the attainable levels of brightness and half-life of the inventive electroluminophores. In processes representing the prior art, hexagonally crystallizing ZnS electroluminophores are obtained initially. These are subsequently subjected to an intense and often harmful mechanical milling process in order to achieve an at least partial reverse transformation to the cubic structure type. The related shortcomings are prevented in advance with the present inventive process.

Step 4. Treatment of the powdery electroluminophores obtained after the main firing process with organic and inorganic acids.

The fine-grain zinc sulfide phosphors obtained after the implementation of preparation steps 1 through 4 are characterized by high photo and cathode luminescence yields. This fact is an indication of the effective inclusion of the activators and coactivators into the ZnS lattice as well as of the high effectiveness of the luminescence processes that occur under these excitation conditions.

It needs to be noted, however, that the phosphors that have been synthesized in this manner do not yet have optimum electroluminescent properties.

The efficiency of the electroluminescence can be increased significantly, however, if the zinc sulfide luminophore powder is subjected to a treatment with organic or inorganic acids, such as hydrochloric acid (HCl), sulfuric acid ($H_2SO_4$), nitric acid ($HNO_3$), acetic acid, or citric acid after the main firing process. For example, acid treatment can take place in about 37% HCl solution for two to six hours while stirring at room temperature. In another embodiment, acid treatment is with 10–20% citric acid for 4–8 hours at 60° C. with stirring.

For this purpose the zinc sulfide phosphors obtained according to this invention are suspended in certain quantities of the solutions of these acids at temperatures between 20 and 60° C., preferably at room temperature, while stirring and the retention time of the luminophore particles in the given acid bath may span a range from 10 minutes up to 10 hours depending upon the type and concentration of the chosen acid, as well as on the chosen temperature. The powdery ZnS electroluminophores are subsequently filtered out, washed to pH neutrality and optionally dried at temperatures of 100 to 120° C.

As shown by electron-microscopic examinations, the inventive finest-grain electroluminophores show a clearly changed morphology of the crystallites after this acid treatment. It is characterized by a high roughness of the crystallite surfaces as well as by the formation of grooves, corners, edges and other structural defects. Such a modification of the habit of the doped ZnS crystallites apparently is an important prerequisite for the increase in the electroluminescence yields of the zinc sulfide luminophores that is noted after the acid treatment.

An advantageous secondary effect of the described acid treatment lies in the further reduction of the average grain size of the luminophore particles, as well as in the further narrowing of the grain size distributions. The scope of this effect can be controlled via the conditions of the acid treatment. The acid treatment furthermore enhances the de-agglomeration of the luminophore particles, resulting in additional advantages for the use of the inventive luminophores in electroluminescent layers (dispersion behavior, layer homogeneity).

Step 5: Re-doping of the finest-grain electroluminophores that have been synthesized according to this invention with certain quantities of activator and/or coactivator ions.

Even with the inventive process it is possible to further increase the EL efficiency through the customary repeated addition of certain quantities of activator compounds, particularly Of $CuSO_4$ and/or coactivator compounds, particularly those containing $Al^{3+}$ ions, and renewed firing of the resulting solids mixtures at temperatures between 300 and 800° C. In this manner a fine adjustment of the activator and/or coactivator concentrations and distribution of the active luminescence centers is achieved in the ZnS matrix.

This re-doping can be effected with copper, gold, manganese, and/or aluminum compounds. Preferred compounds for this re-doping include copper sulfate and/or tetrachloroauric acid or its sodium, salt, and/or manganese sulfate and/or aluminum nitrate.

Re-doping can take place in an air or an inert nitrogen atmosphere, or in an atmosphere consisting of a mixture of nitrogen and 1 to 10% hydrogen.

After a firing time of preferably 30 minutes to 10 hours, the fired product is cooled to room temperature and subsequently washed with $H_2O$, mineral acids (e.g., $HNO_3$), or KCN solution to remove activator and/or coactivator compounds that were not inserted into the ZnS lattice and have precipitated on the surface.

Alternatively, the ZnS is washed with a mineral acid and then with deionized water to pH neutrality and subsequently filtered and dried after their treatment with mineral acids of DCN solution following the re-doping.

Step 6: Annealing of the zinc sulfide electrolurninophores obtained after preparation step 5 for 30 minutes to 5 hours at temperatures between 200 and 500° C.

Alternatively, this annealing step may take place after step 4. Annealing may take place in air or in an inert nitrogen atmosphere or in an atmosphere consisting of a mixture of nitrogen and 1 to 10% hydrogen.

This preparation step, which concludes the inventive process, serves for the final manifesting of the luminophore composition that is advantageous for the performance of the inventive finest-grain zinc sulfide electroluminophores.

The essence of the invention thus lies in combining the described process steps, particularly in carrying out the sequence of the first 4 steps listed.

DETAILED DESCRIPTION OF THE INVENTION

Figure 1:
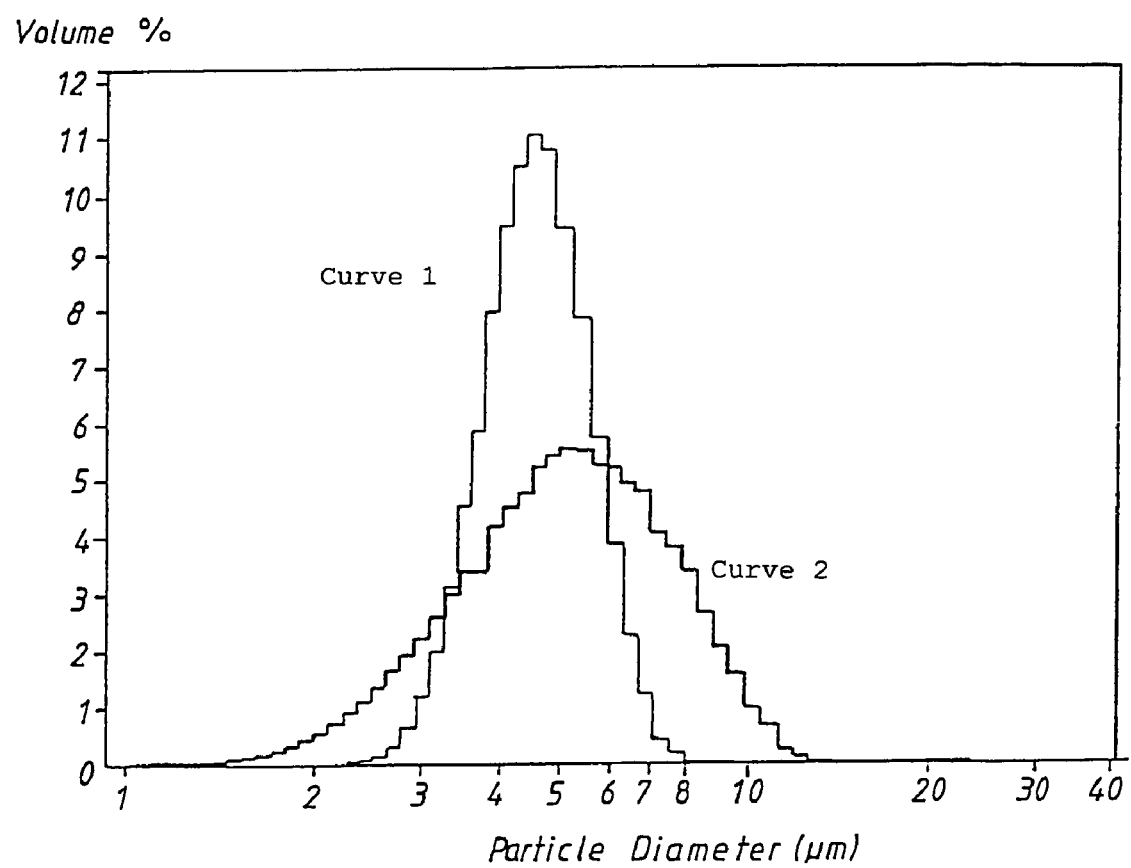
FIG. 1 shows grain size distribution curves for zinc sulfide.

With this method a fine-grain cubic zinc sulfide is already generated during the first step, which is then used as the starting material for the synthesis of the inventive electroluminophores, and the average grain size, grain size distribution and crystal structure of which is essentially maintained by limiting the firing temperature to a maximum of 1000° C. and forgoing the use of fluxing agents with a strongly mineralizing effect in step 3 of the inventive process. At the same time the treatment of the luminophore powders obtained after the firing process with inorganic or organic acids according to step 4 together with the process steps 5 and 6 ensures that the electroluminophores synthesized according to this invention have all the composite and structural characteristics required for attaining a high performance despite their small grain sizes.

The sequence of the above 4 process steps has now made it possible for the first time to obtain powerful fine-grain electroluminophores with grain sizes of 2 to 20 µm by purely preparative means and in a cost-effective manner without having to subsequently correct the grain size by means of milling, and screening, which would entail serious shortcomings.

For screen printing applications, inventive zinc sulfide electroluminophores with average grain sizes of 5 to 20 µm are used. Electroluminophores with these dimensions can be advantageously processed into high-performance EL lamps with a significantly improved layer structure.

Inventive fine-grain electroluminophores with average grain sizes between 2 and 5 µm, on the other hand, are particularly suitable for applications in intaglio or offset printing. They permit the implementation of fine electroluminescent graphic structures, e.g., as security marks in value product printing. These particles are particularly suitable for use in narrow-mesh screens of 120 meshes/inch.

In any case, the inventive luminophores are characterized by a brightness-service life relationship that is adapted to the given application and optimal with respect to the adjusted grain size. Moreover, studies have confirmed that EL elements can be constructed using electroluminophores with average grain sizes of 6 µm produced according to this invention that display levels of brightness and half lives which, under identical operating conditions, are comparable to EL films manufactured from commercially available coarse-grained EL pigments with grain sizes of 20 to 40 µm.

As previously mentioned, the surprisingly high service life of the electroluminophores produced according to this invention, especially of those EL pigments that have average grain sizes of 2 to 5 µm in accordance with this invention, is very likely attributable to their cubic crystal structure, which deviates from the commercially available EL pigments.

According to the prior art this is considered advantageous for attaining high levels of brightness and stability.

The zinc sulfide electroluminophore particles can be coated with thin organic and/or crystalline or amorphous inorganic protective layers so as to increase their service life further. In one embodiment, the protective layer consists of an inner metal oxide film and an outer silicon nitrate film.

The zinc sulfide electroluminophore particles are dispersible, and can be used for printing in a halftone photogravure ink, flexographic printing ink, offset printing ink, letterset printing ink, gravure printing ink. The zinc sulfide electroluminophore particles of the present invention can be applied onto thermal transfer films and transferred to printable material by means of transfer printing. Alternatively, the zinc sulfide electroluminophore particles are embedded in thermoplastic granule matrices and processed into films by means of extrusion/coextrusion and/or thin film casting.

To further improve the stability, the individual crystallites of the inventive electroluminophores may also be provided with suitable protective layers according to the prior art. Numerous methods and materials are known for applying such protective layers.

Further details and advantages of the invention will be explained below based on examples and drawings.

EXAMPLE 1

101 of a 1.4 molar $ZnSO_4$ solution are entered into a reaction vessel. The pH of this solution is subsequently adjusted to 1.0 under addition of sulfuric acid ($H_2SO_4$).

The precipitation of the fine-grain zinc sulfide takes place by passing $H_2S$ gas into the prepared solution while stirring (stirring speed 700 rpm). The volume flow of the $H_2S$ gas is 36 l/h, the work is performed at a reaction temperature of 60° C.

After a reaction time of approximately 500 min. the $H_2S$ flow is stopped. Any $H_2S$ still remaining in the reaction vessel is exhausted, the obtained ZnS suspension is decanted, repeatedly washed with deionized water and finally filtered off. The obtained fine-grain ZnS powder is subsequently dried at a temperature of 120° C.

Curve 1 in FIG. 1 shows the grain size distribution of the fine-grain zinc sulfide prepared in this manner, which was determined with the aid of a Coulter counter grain size measuring instrument. What is striking is the very narrow distribution of the ZnS grain sizes (the so-called QD value, which is calculated based on the equation $QD=(d_{75}-d_{25}/d_{75}+d_{25})$, may be regarded as a measure for the range of the distribution, which, in the present case is QD=0.134); a $d_{50}$ value of 4.7 µm was determined for the average grain size of the ZnS material prepared according to the above described process.

In the next step a certain amount of the obtained zinc sulfide is stirred into a copper sulfate solution. After concentrating and drying of this suspension at approximately 120° C., the material, which is now present as a mixture of solids, is once again homogenized dry and subsequently sifted with a 35 µm gauze. The weighed-in quantities of ZnS and $CuSO_4$ are calculated such as to establish a copper content of 1.5% for the zinc sulfide copper "activator".

A comparable process is also used in the preparation of corresponding $BiI_3$ "activator". In the example described here, the $BiI_3$ content of the ZnS—$BiI_3$ mixture is 8.5%.

The preparation of the batch subsequently takes place by a thorough blending of 1.65 kg of the fine-grain zinc sulfide, 81.5 g of the copper "activator", 7.5 g of the ZnS—$BiI_3$ mixture, as well as 5.2 g aluminum fluoride ($AlF_3$). This mixture is entered into covered quartz pans and fired for 2 hours at a temperature of 980° C. in an $N_2/H_2$ atmosphere with a hydrogen content of 1.5%.

After completion of the firing process, the fired material is cooled to room temperature and repeatedly washed with deionized water.

This is followed by the acid treatment of the obtained material. For this purpose the washed fired material is entered into an acid bath and 2 1$H_2O$ and 500 ml of a 37% hydrochloric acid are added relative to 1 kg of the fired material while stirring. After a retention time of one hour, this is followed by decanting and washing, with deionized water to pH neutrality.

The renewed addition of copper sulfate to this aqueous suspension serves to re-dope the luminophore material. The amount of $CuSO_4$ used for this purpose is calculated according to the ratio of 2 g Cu per 1 kg luminophore.

After concentration by evaporation and drying of the suspension, the dry material is fired in open quartz pans for 2 hours at 600° C. in air. This is followed by an acid wash with 10% $HNO_3$ as well as repeated washing with $H_2O$ to pH neutrality. This is followed by decanting, filtering and drying.

In a concluding process step, the obtained material is once again annealed in open quartz pans for 2 hours at 300° C. in air and homogenized by sifting after it has cooled off.

As a result of these preparation steps a ZnS—CU luminophore with a green electroluminescence is obtained that is characterized by a high level of brightness and long half-life. The average grain size of the powdery electroluminophore is 5.2 µm (QD=0.265). As can be seen from FIG. 1 (Curve 2), the average grain size of the EL pigment prepared according to the example is only significantly above that of the ZnS starting material used in this process.

EXAMPLE 2

As in example 1, the precipitation of the zinc sulfide takes place after $H_2S$ gas is passed into a $ZnSO_4$ solution, however, the reaction parameters are adjusted differently. The reaction is started with a 0.25 molar $ZnSO_4$ solution, the pH is fixed to 1.6, the $H_2S$ volume flow is 60 l/h and the reaction temperature is 40° C.

Figure 2:
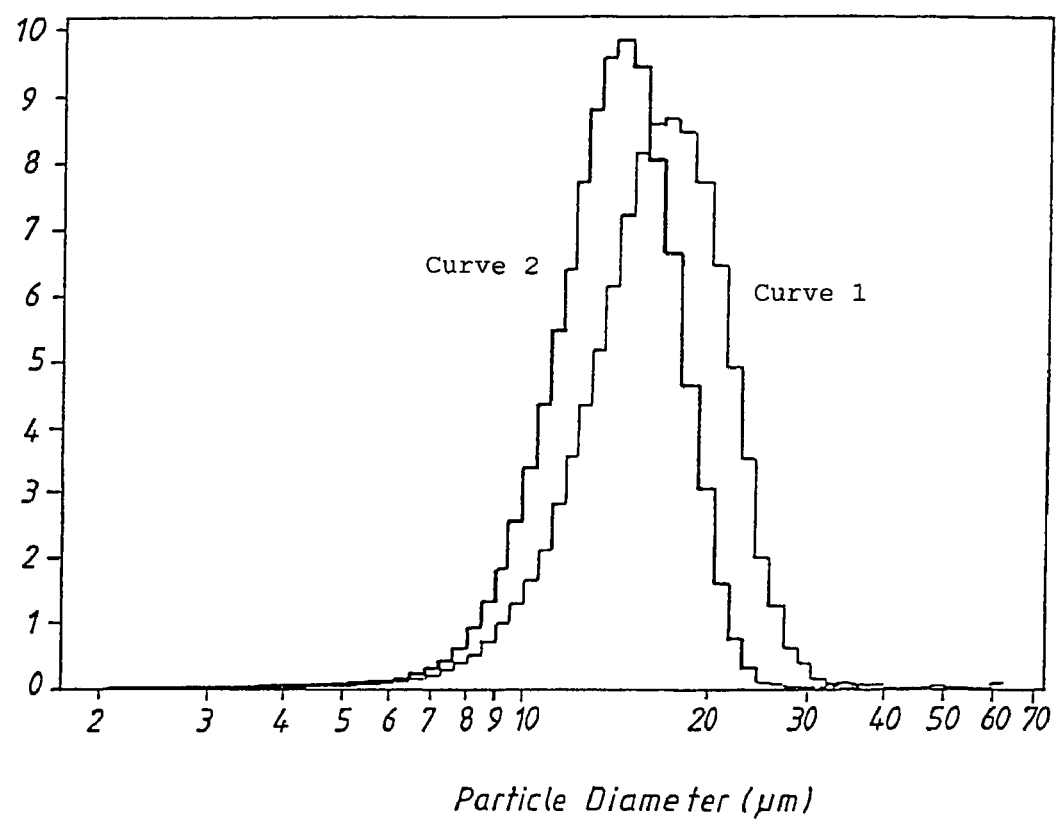
FIG. 2 shows $d_{50}$ values of grain size distribution of electroluminophores of the present invention.

The zinc sulfide that is present in the suspension after completion of the precipitation reaction has an average grain size of 17.0 μm (QD=0.174, see FIG. 2, curve 1). The obtained ZnS suspension is washed repeatedly with deionized water and decanted; afterwards a sufficient amount of copper sulfate is added to establish a copper concentration of the ZnS material of 200 ppm after the activation. The copper activated ZnS suspension is transferred to drying pans and dried at 120° C.

To prepare the starting mixture for the firing process, 1.75 kg of the activated zinc sulfide, 0.5 g $BiI_3$, and 2.5 $AlF_3$ are thoroughly blended. The firing takes place in covered quartz firing pans at 990° C. in air. The firing time is 5 hours.

After cooling the fired product to room temperature and washing it with deionized water, a 5-hour acid treatment is performed with 20% citric acid. This is followed by decanting and washing with $H_2O$ to pH neutrality.

The re-doping of the luminophore material again takes place through addition of copper sulfate (502.5 mg per 1 kg luminophore) to the aqueous ZnS:Cu suspension.

After concentration by evaporation and drying of the suspension the dry product is fired in open quartz pans for 3 hours at 700° C. in air. This is followed by treatment with 10% $HNO_3$ and repeated washing with $H_2O$ (to pH neutrality), decanting, filtering and drying.

The concluding annealing of the zinc sulfide electroluminophore takes place in open quartz pans for 1 hour at 500° C. in air, followed by cooling and sifting.

The resulting ZnS:Cu luminophore has an intense blue electroluminescence, as well as a long half-life. As shown by Curve 2 in FIG. 2, the $d_{50}$ value of the grain size distribution of the inventive electroluminophore presented in this example, which describes the average grain size, is 14.5 μm (QD=0.156) and thus somewhat below the value determined for the corresponding ZnS starting material.

What is claimed is:

1. Zinc sulfide electroluminophores which have a cubic crystal structure and average grain sizes of from 2 to 5 microns;
   Wherein the particles comprise zinc sulfide, activator compounds, and coactivator compounds, wherein the particles are coated with a protective layer consisting of an inner metal oxide film and an outer silicon nitrate film.

2. Zinc sulfide electroluminophores comprising zinc sulfide and activator compounds and coactivator compounds, wherein said electroluminophores have an average grain size of from 5 to 7 microns and a cubic crystal structure, and wherein particles of said zinc sulfide electroluminophores are coated with a protective layer consisting of an inner metal oxide film and an outer silicon nitrate film.

3. Zinc sulfide electroluminophores comprising zinc sulfide, wherein said electroluminophores have an average grain size of from 5 to 7 microns, and wherein particles of said zinc sulfide electroluminophores are coated with a protective layer consisting of an inner metal oxide film and an outer silicon nitrate film.

* * * * *